United States Patent

[11] 3,594,016

| [72] | Inventors | Kenneth R. Wells<br>Joppa;<br>Timothy G. Pugh, Baltimore, both of, Md. |
|---|---|---|
| [21] | Appl. No | 854,867 |
| [22] | Filed | Sept. 3, 1969 |
| [45] | Patented | July 20, 1971 |
| [73] | Assignee | The Black and Decker Manufacturing Company<br>Towson, Md. |

[54] WHEEL HEIGHT ADJUSTMENT FOR LAWNMOWER
10 Claims, 6 Drawing Figs.

[52] U.S. Cl.................................................. 280/43.17
[51] Int. Cl........................................................ B62d 21/18
[50] Field of Search............................................ 280/43,
43.17; 56/25.4, 26; 74/535

[56] References Cited
UNITED STATES PATENTS

| 303,405 | 8/1884 | Stafford...................... | 280/43.17 |
| 2,013,629 | 9/1935 | Geraldson................... | 74/535 |
| 2,680,339 | 6/1954 | Murphy....................... | 280/43 |
| 2,818,270 | 12/1957 | Cataline...................... | 280/43.17 |
| 2,836,430 | 5/1958 | Langenbaeher............ | 280/43 |
| 2,915,318 | 12/1959 | Chesser...................... | 280/43 |

*Primary Examiner*—Benjamin Hersh
*Assistant Examiner*—Robert R. Song
*Attorneys*—Leonard Bloom and Joseph R. Slotnik

ABSTRACT: A powered lawnmower including a housing supported for movement by ground-engaging wheels. A powered cutting reel is supported upon the housing and cooperates with a stationary bed knife on the housing to cut grass as the mower travels along the ground. Novel means is provided to effect vertical adjustment of at least some of the wheels relative to the housing whereby to adjust the height to which the grass is cut.

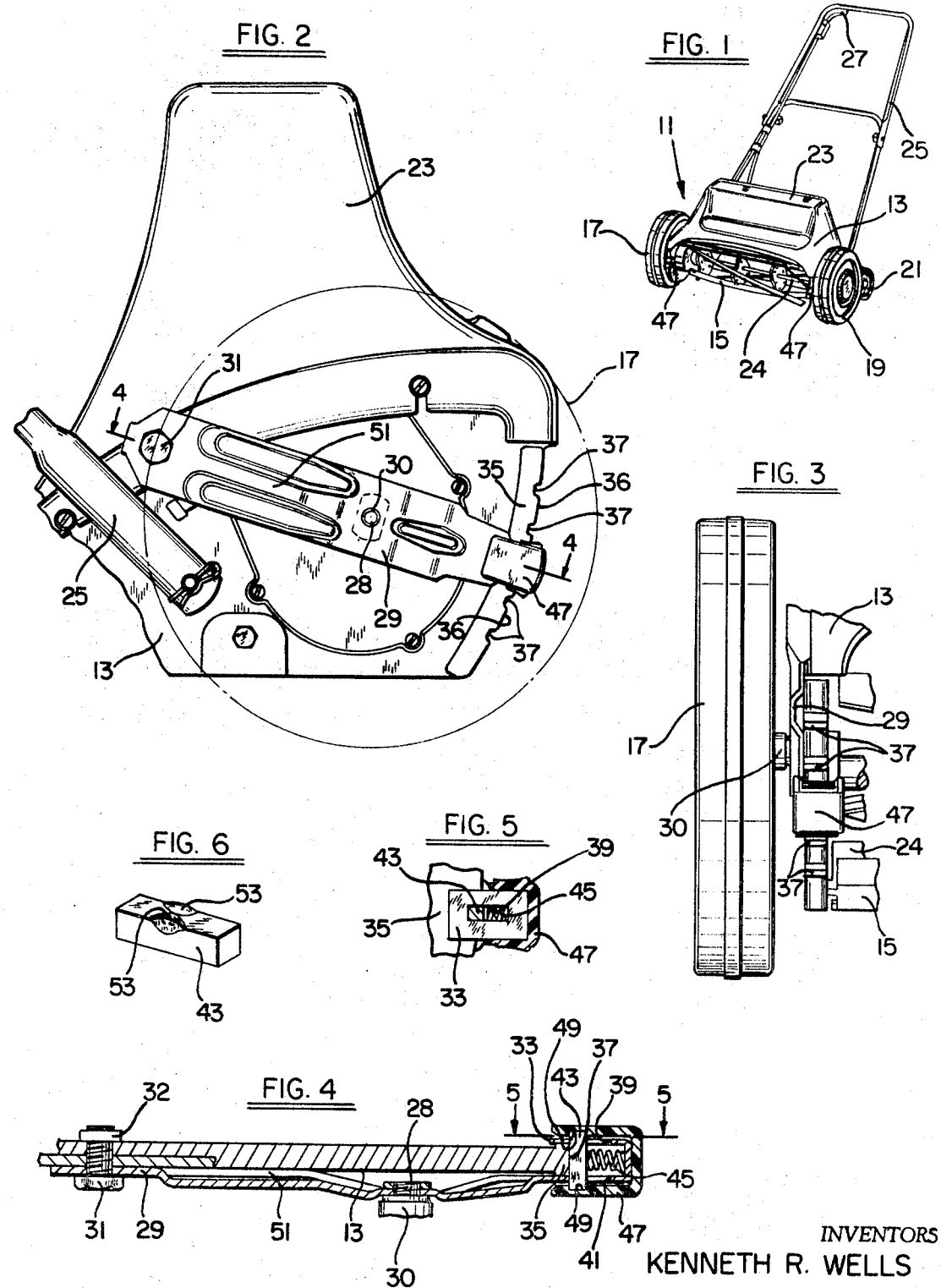

WHEEL HEIGHT ADJUSTMENT FOR LAWNMOWER

SUMMARY OF THE INVENTION

The present invention is directed to a novel wheel height adjustment construction for use on lawn and garden devices such as lawnmowers and the like, which construction includes a bracket pivotally guided on a housing for movement in a generally vertical plane and having a wheel supported thereon. A detent member on the bracket is cooperable with vertically spaced means formed directly on the housing to releasably lock the bracket and wheel in selected vertically adjusted positions relative to the housing. Additional features include means which normally biases the detent member toward the vertically spaced means, and a handle, slidable on the bracket, which retains the detent member and biasing means in place. This novel construction embodies the desirable features of simplicity, stability and reliability.

Main objects of the present invention, therefore, are to provide a novel wheel height adjustment construction for a lawnmower and the like, which construction is integrated with the mower housing and embodies the utmost in simplicity, stability, and reliability.

Further objects of the present invention are to provide a construction of the above character which is relatively inexpensive to manufacture and easy to assemble and disassemble.

BROAD STATEMENT OF THE INVENTION

Broadly described, the present invention relates to a mobile lawn device including a housing, ground-engaging wheels supporting said housing for movement along the ground, tool means carried by said housing, and means for adjusting the vertical position of at least one of said wheels relative to said housing to thereby adjust the height of said tool means relative to the ground; the improvement in said device wherein said adjustment means includes an elongated bracket pivoted at one end upon said housing for movement in a generally vertical plane, said bracket having a return bent portion at its other end enfolding an edge of said housing, said edge having a plurality of vertically spaced, noncircular recesses formed therein, a pin spanning said bracket and return bent portion and slidably disposed in slots therein, said pin having a noncircular cross section complementary to said recesses and cooperable with the sides of said slots to prevent rotation of said pin in said slots, whereby to reduce twisting of said bracket, means normally biasing said pin in a first direction toward said recesses, and handle means detachably secured to said pin for moving said pin in a second direction opposite to said first direction.

In still another aspect, the present invention relates to an adjustable detent mechanism comprising a frame having an arcuate edge, a bracket pivoted at one end to said frame and having a return bent portion at its other end embracing said arcuate edge, detent means including a generally rectangular cross-sectional pin slidably and nonrotatably disposed in aligned slots in said bracket and return bent portion and selectively receivable in rectangular cross-sectional recesses formed in said edge, spring means carried by said bracket and normally biasing said pin toward said recesses, and handle means detachably secured to said pin and retaining said pin and spring means within said bracket.

In another aspect, the present invention relates to a mobile lawn device including a housing, ground-engaging wheels supporting said housing for movement along the ground, tool means carried by said housing, and means for adjusting the vertical position of at least one of said wheels relative to said housing to thereby adjust the height of said tool means relative to the ground; the improvement in said device wherein said adjustment means includes an elongated bracket pivoted at one end upon said housing for movement in a generally vertical plane, said bracket having a return bent portion at its other end enfolding an edge of said housing, said edge having a plurality of vertically spaced, generally rectangular recesses formed therein, a pin slidably disposed on said bracket and spanning said bracket and return bent portion and extending beyond said bracket and said return bent portion, said pin having a generally rectangular cross section complementary to said recesses, means caged between said bracket and said pin normally biasing said pin in a first direction toward said recesses, handle means having opposed internal recesses removably receiving the ends of said pin and retaining said biasing means in place, said handle means adapted to move said pin in a second direction opposite to said first direction.

In still another aspect, the present invention relates to a mobile lawn device including a housing, ground-engaging wheels supporting said housing for movement along the ground, tool means carried by said housing, and means for adjusting the vertical position of at least one of said wheels relative to said housing to thereby adjust the height of said tool means relative to the ground; the improvement in said device wherein said adjustment means comprises an elongated bracket pivoted at one end to said housing for movement about a generally horizontal axis and closely disposed relative thereto, means mounting a wheel on said bracket, said bracket having a return bent portion at its other end embracing an edge of said housing, a manually releasable locking pin slidable on said bracket adjacent said other end spanning said bracket and said return bent portion and cooperable with vertically spaced recesses formed on said housing edge, a spring normally biasing said pin toward said housing edge, said spring including a coil compression spring which directly engages said pin, deformed projection means formed on said pin and received within said spring to hold said spring in place, whereby to facilitate ready vertical adjustment of said at least one wheel vertically relative to said housing and said tool means relative to the ground.

In yet another aspect, the present invention relates to an adjustable detent mechanism comprising a frame having an arcuate edge, a bracket pivoted at one end to said frame and having a return bent portion at its other end embracing said arcuate edge, detent means including a generally rectangular cross-sectional pin slidably carried by said bracket and return bent portion and selectively receivable in rectangular cross-sectional recesses formed in said edge, spring means carried by said bracket and normally biasing, said pin toward said recesses, said spring means including a coil compression spring bearing against said pin, said pin having deformed portions providing projections which are received within said spring, whereby to holds said spring in place, and handle means detachably secured to said pin and retaining said pin and spring means within said bracket.

BRIEF DESCRIPTION OF THE DRAWINGS

FIG. 1 is a perspective view illustrating a lawnmower embodying the present invention;

FIG. 2 is an enlarged view of a portion of FIG. 1 shown with the wheel in dot-dash lines for clarity;

FIG. 3 is a front elevational view of FIG. 2;

FIG. 4 is an enlarged sectional view of FIG. 2 taken along the line 4—4 thereof;

FIG. 5 is a sectional view of FIG. 4 taken along the line 5—5 thereof; and

FIG. 6 is an enlarged perspective view of the detent pin.

DETAILED DESCRIPTION

Referring now more specifically to the drawings, a lawnmower, which is one type of mobile lawn device in which the present invention finds use, is illustrated generally at 11 in FIG. 1 and is seen to include a frame or housing 13 having a cutting reel 15 supported thereon. The housing 13 is supported for movement over the ground by a pair of large, front wheels 17, 19 and a pair of small, rear wheels 21 (only one of which is shown). The reel 15 is driven by a battery-powered electric motor (not shown) supported upon the housing 13 under a detachable shroud 23 and cooperates with a stationary bed knife 24 to cut grass as the mower 11 moves along the ground. An upstanding handle 25 is provided on the housing 13 for manipulation and control of the mower 11 and has a switch lever 27 for turning the motor on and off.

It is customary to adjust the height of the housing 13 and reel 15 relative to the ground to correspondingly adjust the length to which the grass is cut. To this end, the wheels 17, 19 and housing 13 are vertically adjustable relative to one another so that by raising the wheels 17, 19 relative to the housing 13, the height of cut is lowered, and by lowering the wheels 17, 19, the height of cut is raised. Described hereinafter and illustrated in FIGS. 2—6, is a novel height adjustment construction for wheel 17; however, it will be understood that wheel 19 is similarly adjustably mounted at the opposite side of the housing 13 by structure which is substantially the mirror image of that illustrated and hereinafter described for wheel 17.

Thus, the wheel 17 is rotatably secured through an axle bolt 28 and bearing 30 to an intermediate point of an elongated bracket 29 which, in turn, has one end pivotally secured to the housing 13 by a bolt 31 and nut 32. The other end of the bracket 29 has a return bent end 33 spaced from the bracket 29 which enfolds and embraces an edge 35 of the housing 13. As shown in FIGS. 2 and 3, the housing edge 35 is thickened and arcuately shaped on a radius from the pivot bolt 31 and has a plurality of vertically spaced recesses 37 formed therein. The bracket 29 and its return bent portion are slotted at 39, 41, respectively, and carry a pin 43 therein which is positionable selectively in the recesses 37 to retain the bracket 29 in vertically adjusted positions relative to the housing 13. The pin 43 is normally biased toward engagement with the recesses 37 by a compression spring 45 caged between the pin 43 and the bracket end. A hollow rectangular handle or cap 47 is slidably fitted over the bracket end and is held in place by the projecting ends of the pin 43 which are received in recesses 49 formed in the sides of the handle 47. The ends of the handle 47 cover the open sides between the bracket 29 and its return bent portion 33 and retains the spring 45 in place.

As described above, the wheels 17, 19 are each secured to one of the brackets 29 which, in turn, is pivoted to the housing 13 for movement about a horizontal axis and in a generally vertical plane. When it is desired to adjust the height of cut performed by the reel 15 and bedknife 24, the wheels 17, 19 are vertically adjusted relative to the housing 13, upwardly when it is desired to lower the height of cut, and downwardly when it is desired to raise the height of cut. This is performed by pulling outwardly on the handles 47 to withdraw the pins 43 from the recesses 37 against the spring 45. The brackets 29 can then be pivoted to the desired adjusted position whereupon the handles 47 are released and the pins 43 relocated in another set of recesses 37. If desired, the handle 47 can be knurled or roughened for better gripping and indicia printed on the edges 35 adjacent the recesses 37 to indicate the height of cut provided by each.

As described above, the wheel height adjustment construction of the present invention embodies simplicity, stability, and reliability. Thus, for simplicity, the brackets 29 are mounted directly on the housing 13 and the detent recesses 37 are formed directly on the edges 35 of this housing. For stability, the brackets 29 have a portion 51 which bears against the outer sides of the housing 13 and the return bent ends 33 of each bracket 39 bear against the thickened edge 35. Also, the pins 43 extend traversely of the recesses 37 and are preferably generally rectangular in cross section as are the recesses 37 and the slots 39, 41 in the brackets 29. This provides for greater rigidity in the parts and particularly reduces the tendency of the brackets 29 to twist. Further, the pins 43 may be provided with upward projections 53 which fit within the springs 45 to help hold them in place. These projections may be achieved by cold forming or coining the sides of the pins 43 so that material is forced outwardly at the top of the pins 43 (see FIG. 6.)

By the foregoing, there has been disclosed in improved lawn device wheel height adjustment construction calculated to fulfill the inventive objects hereinabove set forth, and while a preferred embodiment has been set forth, various additions, substitutions modifications and omissions may be made thereto without departing from the spirit of the invention.

We claim:

1. In a mobile lawn device including a housing, ground-engaging wheels supporting said housing for movement along the ground, tool means carried by said housing, and means for adjusting the vertical position of at least one of said wheels relative to said housing to thereby adjust the height of said tool means relative to the ground; the improvement in said device wherein said adjustment means includes an elongated bracket pivoted at one end upon said housing for movement in a generally vertical plane, said bracket having a return bent portion at its other end enfolding an edge of said housing, said edge having a plurality of vertically spaced, noncircular recesses formed therein, a pin spanning said bracket and return bent portion and slidably disposed in slots therein, said pin having a noncircular cross section complementary to said recesses and cooperable with the sides of said slots to prevent rotation of said pin in said slots, whereby to reduce twisting of said bracket, means normally biasing said pin in a first direction toward said recesses, and handle means detachably secured to said pin for moving said pin in a second direction opposite to said first direction.

2. The improvement of claim 1 in which includes a spring on said bracket and normally biasing said pin toward said housing edge.

3. The improvement of claim 2 which includes a hollow handle slidable on said bracket and detachably secured to said pin, said spring being caged between said pin and said bracket and retained in place by said handle.

4. The improvement of claim 1 wherein said pin and said recesses are generally rectangular in cross section.

5. The improvement of claim 1 wherein said bracket and said return bent portion closely but slidably embrace said housing edge.

6. The improvement of claim 1 wherein said biasing means is caged between said bracket and said pin and is retained in place by said handle means.

7. The improvement of claim 1 wherein said housing edge includes a thickened portion provided with a plurality of vertically spaced recesses, said bracket and said return bent portion slidably engaging said thickened edge portion, whereby to slidably guide said bracket through its pivotal movement.

8. An adjustable detent mechanism comprising a frame having an arcuate edge, a bracket pivoted at one end to said frame and having a return bent portion at its other end embracing said arcuate edge, detent means including a generally rectangular cross-sectional pin slidably and nonrotatably disposed in aligned slots in said bracket and return bent portion and selectively receivable in rectangular cross-sectional recesses formed in said edge, spring means carried by bracket and normally biasing said pin toward said recesses, and handle means detachably secured to said pin and retaining said pin and spring means within said bracket.

9. In a mobile lawn device including a housing, ground-engaging wheels supporting said housing for movement along the ground, tool means carried by said housing, and means for adjusting the vertical position of at least one of said wheels relative to said housing to thereby adjust the height of said tool means relative to the ground; the improvement in said device wherein said adjustment means includes an elongated bracket pivoted at one end upon said housing for movement in a generally vertical plane, said bracket having a return bent portion at its other end enfolding an edge of said housing, said edge having a plurality of vertically spaced, generally rectangular recesses formed therein, a pin slidably disposed on said bracket and spanning said bracket and return bent portion and extending beyond said bracket and said return bent portion, said pin having a generally rectangular cross section complementary to said recesses, means caged between said bracket and said pin normally biasing said pin in a first direction toward said recesses, handle means having opposed internal recesses removably receiving the ends of said pin and retaining said biasing means in place, said handle means adapted to move said pin in a second direction opposite to said first direction.

10. In a mobile lawn device including a housing, ground-engaging wheels supporting said housing for movement along the ground, tool means carried by said housing, and means for adjusting the vertical position of at least one of said wheels relative to said housing to thereby adjust the height of said tool means relative to the ground; the improvement in said device wherein said adjustment means comprises an elongated bracket pivoted at one end to said housing for movement about a generally horizontal axis and closely disposed relative thereto, means mounting a wheel on said bracket, said bracket having a return bent portion at its other end embracing an edge of said housing, a manually releasable locking pin slidable on said bracket adjacent said other end spanning said bracket and said return bent portion and cooperable with vertically spaced recesses formed on said housing edge, a spring normally biasing said pin toward said housing edge, said spring including a coil compression spring which directly engages said pin, deformed projection means formed on said pin and received within said spring to hold said spring in place, whereby to facilitate ready vertical adjustment of said at least one wheel vertically relative to said housing and said tool means relative to the ground.

11. An adjustable detent mechanism comprising a frame having an arcuate edge, a bracket pivoted at one end to said frame and having a return bent portion at its other end embracing said arcuate edge, detent means including a generally rectangular cross-sectional pin slidably carried by said bracket and return bent portion and selectively receivable in rectangular cross-sectional recesses formed in said edge, spring means carried by said bracket and normally biasing said pin toward said recesses, said spring means including a coil compression spring bearing against said pin, said pin having deformed portions providing projections which are received within said spring, whereby to hold said spring in place, and handle means detachably secured to said pin and retaining said pin and spring means within said bracket.